Sept. 6, 1932.  J. MORCH  1,876,312
MOTOR SUSPENSION
Filed Nov. 6, 1930  3 Sheets-Sheet 1
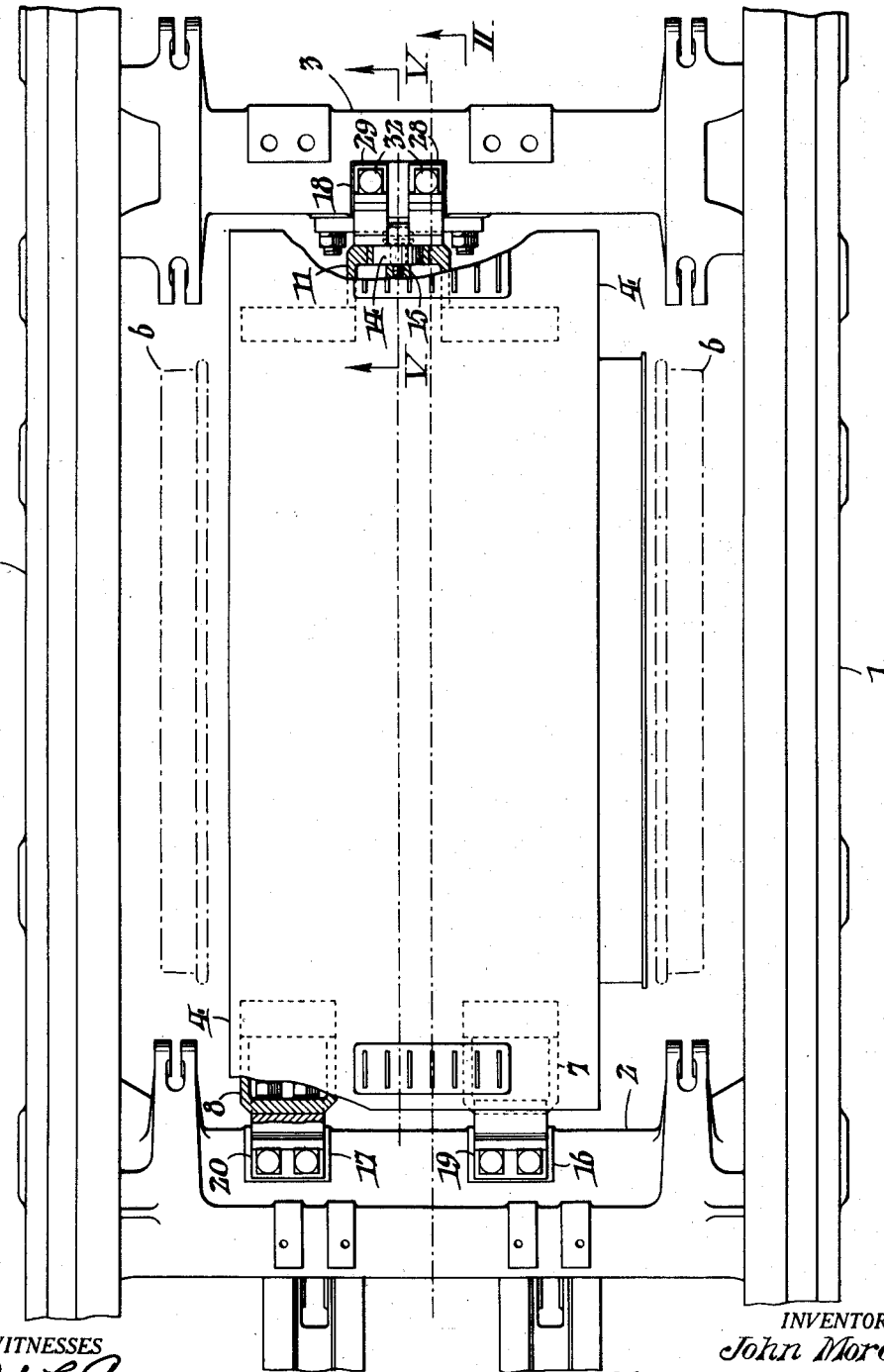

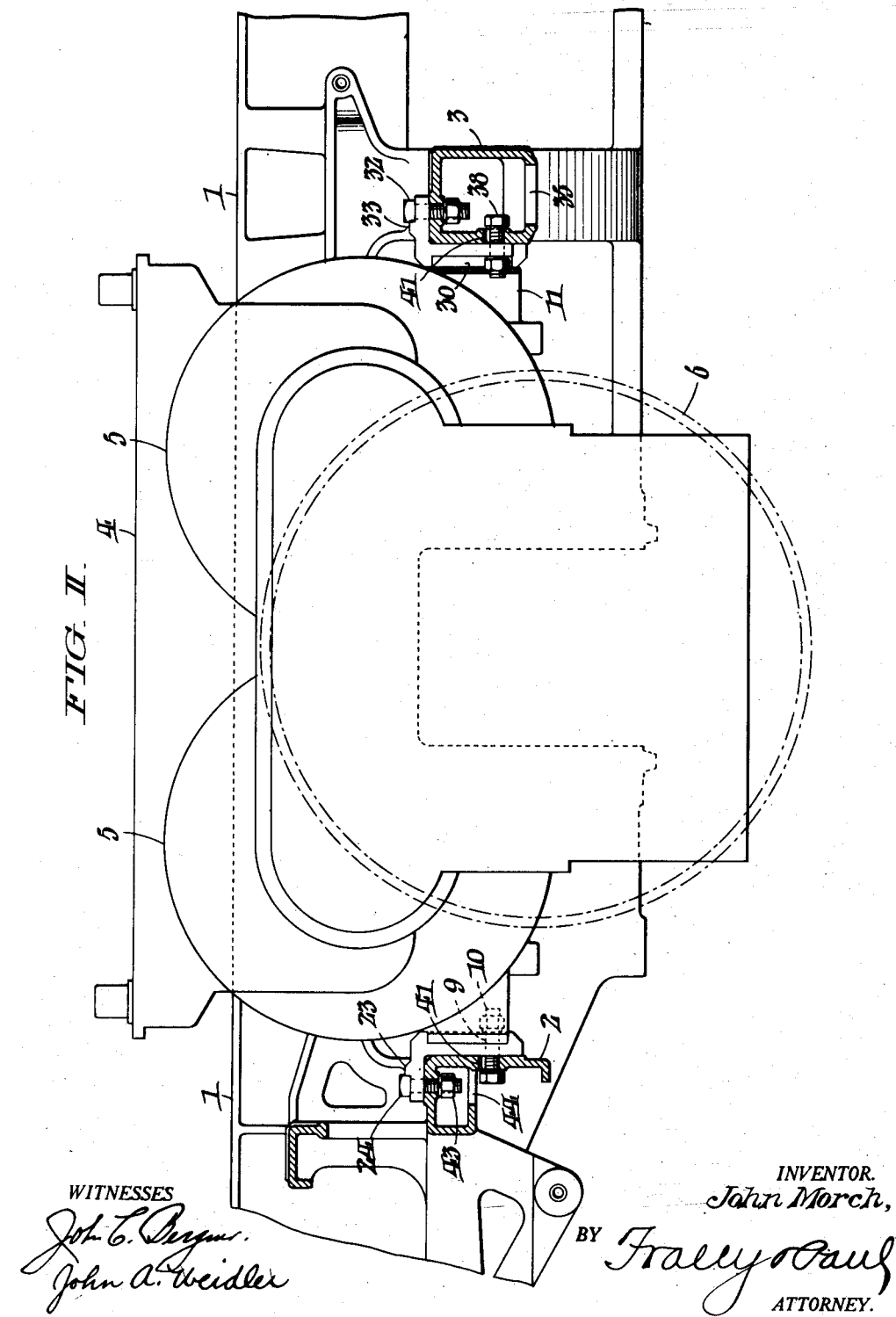

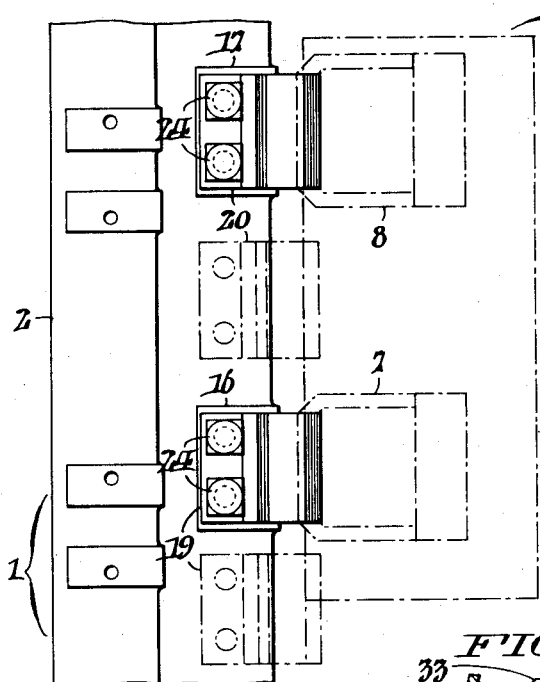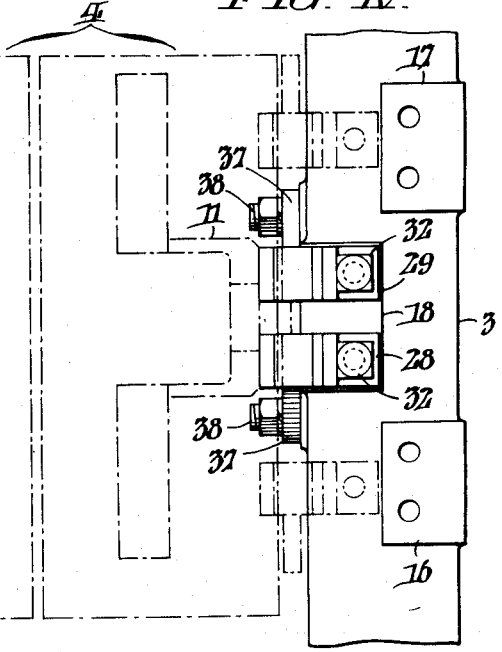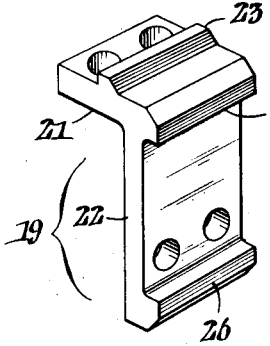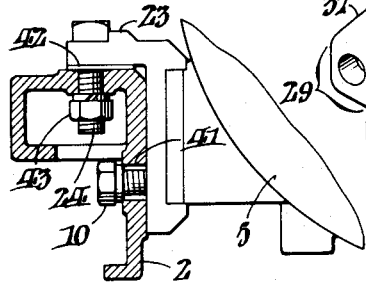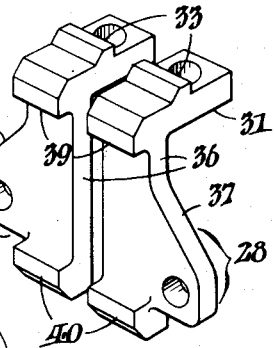

Patented Sept. 6, 1932

1,876,312

UNITED STATES PATENT OFFICE

JOHN MORCH, OF ALTOONA, PENNSYLVANIA

MOTOR SUSPENSION

Application filed November 6, 1930. Serial No. 493,736.

This invention relates generally to the suspension of motors within the main frames of vehicles, and more particularly to the mounting of motor frames within electric locomotives.

One object of the invention is to provide improved means for effecting a three point support for a motor frame within the main frame of a locomotive or like vehicle, the motor frame being rigidly suspended at two points on one cross tie and non-rigidly suspended at a third point on another cross tie, so that such distortion as may occur in the main frame of the vehicle will not disturb or place any strain on the motor frame.

Another object of the invention is to provide at the points of suspension brackets adapted for attachment to the cross ties of the main frame and serving also to carry the weight of the motor frame, said brackets being so formed as to facilitate the insertion and removal of the motor frame with respect to the main frame of the vehicle.

Another object of the invention is to provide motor suspension members which are capable of vertical adjustment to compensate for the settling of the main frame of the vehicle upon its springs, a condition which disturbs the relation of the motors to the axles of the driving wheels.

Still other objects and advantages characteristic of my invention will become more apparent from the detailed description of one embodiment or example thereof which follows hereinafter, having reference to the accompanying drawings, whereof:

Fig. I represents a plan view of a portion of the main frame of an electric locomotive with a motor frame suspended thereon according to my invention.

Fig. II represents a longitudinal section of the same, taken as indicated by the lines II—II of Fig. I.

Fig. III represents an enlarged plan view of a portion of the cross tie shown at the left hand end of Fig. I.

Fig. IV represents an enlarged plan view of a portion of the cross tie shown at the right hand end of Fig. I.

Fig. V represents an enlarged cross section, taken as indicated by the lines V—V of Fig. I.

Fig. VI represents an enlarged perspective view of a motor suspension bracket used at one end of the motor frame.

Fig. VII represents an enlarged perspective view of a pair of motor suspension brackets used at the other end of the motor frame; and, Fig. VIII represents a cross section of a cross tie with a shim interposed between its top wall and the horizontal leg of a motor suspension bracket.

In the drawings only a portion of the main locomotive frame is shown. This portion comprises longitudinal side sills 1, and box shaped cross ties 2 and 3 forming a rectangular opening in which a twin motor frame 4 is adapted to be inserted. Obviously throughout the remainder of the locomotive frame other similar rectangular openings may be provided for additional motor frames, and this invention contemplates the use of a plurality of motor frames with motors mounted thereon in any desired arrangement. For the purpose of the present description, a twin motor frame has been selected, each motor being indicated in outline at 5. Furthermore, the manner in which the motors 5 are connected to the axle of the locomotive driving wheels indicated at 6 forms no part of the present invention, and it may be assumed that a common form of quill or flexible link drive is used to provide a flexible connection between these parts so that spring motion of the locomotive frame will not affect the transmission of the driving power to the wheels.

The motor frame 4 is provided at one end with two pads 7 and 8, in the form of blocks having portions extending outward beyond the extreme edge at the end of the motor frame and having holes 9 therein for accommodating bolts 10. At the other end of the motor frame 4 a single central pad 11 is provided, this pad being shown in detail in Fig. V. The pad 11 includes a vertical member 12 with a cylindrical opening therein accommodating a bushing 13 and the annular portion of a trunnion 14, which is rotatable within the bushing 13. To hold the trunnion in place, while permitting its rotation with respect to the pad 11, a bolt 15 is provided. Corresponding with each motor frame pad are pads 16, 17 and 18 on the cross ties 2 and 3. The cross tie pads 16, 17 and 18 are formed integrally with the locomotive frame casting, and they constitute merely raised portions on the top and side walls of the box-shaped cross ties 2 and 3. It will be noted that cross tie pads 16, 17 and 18 and the corresponding pads 7, 8 and 11 of the motor frame 4 are disposed in such manner as to provide a three point motor suspension with the longitudinal axis of the motor frame parallel to but spaced from the longitudinal axis of the locomotive frame. This arrangement provides a larger space between the motor frame 4 and side sills 1 at one side of the locomotive than at the other side, the larger space being at the pinion side of the motors and the smaller space being at the commutator side of the motors.

Interposed between each motor frame pad 7, 8, 11 and each cross tie pad 16, 17, 18, there is a motor suspension bracket. Two of these brackets 19 and 20 are identical, each comprising, as shown in Fig. VI, a horizontal leg 21 and a vertical leg 22 forming an inverted L of dimensions substantially similar to the cross tie pads 16 and 17 upon which they rest. The horizontal leg 21 of each bracket 19, 20 extends across the top of the cross tie 2 and is formed with a shoulder 23 adapted to prevent rotation of the heads of bolts 24 which secure the bracket to the top wall of the cross tie 2. Nuts 43 for the bolts 24 are inserted through the openings 44 in the bottom of cross tie 2. The vertical leg 22 of each bracket 19, 20 is formed with upper and lower ledges 25 and 26. The lower ledge 26 extends beneath the corresponding pad on the motor frame carrying its weight. The upper ledge 25 extends above the corresponding motor frame pad to prevent the motor frame from rising on the main frame due to motor torque when current is being taken by the motors. The bolts 10 pass from the interior of cross tie 2 through its side wall and pads 16 and 17, through motor suspension brackets 19 and 20, and through motor frame pads 7 and 8, rigidly attaching the motor frame at two points on cross tie 2.

Two other motor suspension brackets 28 and 29, shown in detail in Fig. VII, are interposed between the vertical wall of cross tie 3 and the flanged portion 30 of the trunnion 14, and are adapted to fit snugly between these parts. Brackets 28 and 29 are formed with horizontal legs 31 secured by bolts 32 to the top of cross tie 3. The heads of bolts 32 are held against rotation by shoulders 33, and their nuts 34 are accessible through the opening 35 in the bottom of the cross tie. The vertical legs 36 of brackets 28 and 29 are formed with wing portions 37 which are secured to the side wall of cross tie 3 by bolts 38. The vertical legs 36 are also provided with upper and lower ledges 39 and 40 which overlap the edges of the flanged portion 30 of the trunnion 14, one ledge 40 projecting beneath the flange 30 and the other ledge 39 projecting above the flange 30. It will be evident that the trunnion flange 30 is not rigidly secured to cross tie 3 but merely fits between the projecting ledges 39 and 40. Accordingly, the motor frame 4 is suspended by rigid attachment to one cross tie 2 at two points and is non-rigidly supported at a third point on another cross tie 3. This manner of suspension prevents any distortion of the locomotive main frame from disturbing the motor frame and insures that the motor frame will not be unduly strained by any such distortion.

The above described arrangements permits the twin motor frame 4 to be inserted with the locomotive frame from beneath the same. This is most desirable because it enables the motors to be positioned or removed without disturbing the cab structure. To place the motor frame 4 in position on the locomotive frame, the motor suspension brackets 19 and 20 are loosely placed on cross tie 2 in the position indicated in dotted lines in Fig. III, in which position they do not engage the cross tie pads 16 and 17. Similarly, motor suspension brackets 28 and 29 are placed in the positions shown in dotted lines in Fig. IV on cross tie 3, one on each side of the pad 18. The motor frame is then raised to a position in which its pads 7, 8 and 11 are directly opposite cross tie pads 16, 17 and 18 and spaced evenly therefrom. With the motor frame 4 in this position, the brackets 19 and 20 are slid horizontally between motor frame pads 7 and 8 and cross tie pads 16 and 17. Likewise brackets 28 and 29 are slidably interposed between the trunnion flange 30 and cross tie pad 18. Bolts 10, 24, 32 and 38 are then inserted and their respective nuts drawn up. The removal of the motor frame 4 is accomplished in a similar manner by sliding suspension brackets 19, 20, 28 and 29 out from between the cross tie pads and motor frame pads in a horizontal direction transverse to the locomotive frame until they are disengaged. It will be noted that the insertion or removal of the motor frame in the manner described is made possible by the design of the various parts constituting the motor frame supports. Inasmuch as the ledges 25 and 26 on the motor suspension brackets 19 and 20 project above and below motor frame pads 7 and 8 to a distance less than the aggregate of the thickness of the cross tie pads 16, 17 and the extent to which the motor frame pads 7, 8 project beyond the motor frame proper, there is no difficulty in inserting these brackets in their proper positions, and yet full advantage is taken of the space available for the motor frame. It is likewise true of brackets 28 and 29 that their ledges 39 and 40 project to a distance less than the aggregate of the thickness of pad 18 and the extent to which the trunnion 30 projects beyond the motor frame proper.

With electric locomotives in which the main frame is supported on the axles through springs and in which the motors are mounted on the main frame, as in the present example in which twin motors are flexibly connected with the driving wheels through a quill or the like, it becomes necessary to provide means for centering the driving axle in the quill, due primarily to the fact that the motor and quill are each spring supported, while the driving axle, through the driving wheel, rests on the track. Since the locomotive frame tends to settle on the springs, the center of the motor quill may in the course of time be brought below the center of the driving axle. This necessitates raising the motor frame with respect to the locomotive frame to maintain the proper clearance between the inside of the motor quill and the outside of the driving axle.

In order to provide for such an adjustment, the cross ties 2 and 3 have enlarged bolt holes 41 of oblong shape in their side walls. To raise the motors on the main frame of the locomotive, the horizontal bolts 10 and 38 and the vertical bolts 24 and 32 are loosened and shims 42 of the desired thickness are introduced between cross tie pads and the horizontal legs of the motor suspension brackets, as shown in Fig. VIII. The lengths of bolts 24 and 32 are such as to permit of this adjustment. After the desired shim thickness is introduced, the holding bolts 10 and 38 are drawn down to hold the motor frame 4 in the new position.

From the above description it will be apparent that the motor suspension of this invention provides a convenient means of attachment by which a motor frame may be rigidly secured at two points on one cross tie and non-rigidly supported at a third point on another cross tie, and that the elements forming the motor supports are so designed as to facilitate the insertion and removal of the motor frame, at the same time taking full advantage of the space available for the motors, and affording a snug fit between the motor frame and vehicle frame.

While the invention has been described in some detail and with particular reference to one form which it may take, it will be evident that the invention is not confined in its application to a three point suspension for motor frames or to the particular type of vehicle and motor frames herein selected, and that various changes may be made in the form of the apparatus herein shown and described without departing from the spirit of the invention.

Having thus described my invention, I claim:

1. In combination with a vehicle frame including cross ties, and a motor frame of such dimensions that it may pass through the vehicle frame between said cross ties, a removable motor suspension member adapted to be interposed between a cross tie and the motor frame, said member having a leg extending across the top of the cross tie and having oppositely directed upper and lower ledges accommodating a part of the motor frame therebetween and carrying the weight thereof.

2. In combination with a vehicle frame including cross ties and a motor frame of such dimensions that it may pass through the vehicle frame between said cross ties, said motor frame having a pad in the form of a block projecting outward at the end thereof, a removable motor suspension member fitting snugly between the vertical wall of a cross tie and the motor frame pad, said member having a leg extending across the top of the cross tie and bolted thereto and having oppositely directed upper and lower ledges extending above and beneath the motor frame pad to carry the weight of the motor frame, whereby the motor frame may be mounted in the vehicle frame by raising or lowering the motor frame into position and then sliding the motor suspension member along the cross tie into place.

3. In combination with a vehicle frame including cross ties of box section, and a motor frame having a pad extending outwardly therefrom, motor suspension means comprising a bracket having a horizontal leg bolted to the top of a cross tie and having a vertical leg fitting snugly between the wall of the cross tie and the motor frame pad, said vertical leg having a ledge extending beneath the motor frame pad, and bolts passing through said cross tie, the vertical leg of said bracket, and said motor frame pad for rigidly securing said parts together.

4. In combination with a vehicle frame including cross ties having raised portions, and a motor frame having pads projecting outwardly therefrom, a bracket adapted to fit between a cross tie wall and a motor frame pad, said bracket having a portion extending across the top of said cross tie and having an oppositely directed ledge projecting beneath said motor frame pad to a distance less than the sum of the thickness of said cross tie raised portions and the extent to which the motor frame pad projects beyond the motor frame, whereby said bracket may be slidably interposed between said cross tie and motor frame pad when the motor frame is inserted in the vehicle frame from beneath.

5. In combination with a vehicle frame including cross ties having raised portions, and a motor frame having pads projecting outwardly therefrom, a bracket adapted to fit between a cross tie wall and a motor frame pad, said bracket having a portion extending across the top of said cross tie and having oppositely directed upper and lower ledges projecting above and below said motor frame pad to a distance less than the sum of the thickness of said cross tie raised portions and the extent to which the motor frame pad projects beyond the motor frame, whereby said bracket may be slidably interposed between said cross tie and motor frame pad when the motor frame is inserted in the vehicle frame from beneath.

6. A motor suspension bracket comprising a horizontal leg adapted to rest on the top of a cross tie of a vehicle frame, said leg having a bolt hole and a shoulder for engaging a bolt head adjacent thereto, and a vertical leg adapted to be interposed between the vertical wall of the cross tie and a pad on the motor frame, said vertical leg having a lower ledge extending beneath the pad to carry the weight of the motor frame and an upper ledge extending above the pad to prevent the motor frame from rising.

7. In combination, a vehicle frame including cross ties, a motor frame rigidly supported on one said cross tie and non-rigidly supported on another said cross tie, said latter support comprising a trunnion on the motor frame, and a motor suspension bracket interposed between the cross tie wall and trunnion, and secured to the cross tie, the bracket having ledges overlapping the edges of a portion of said trunnion.

8. In combination, a vehicle frame including cross ties, a motor frame rigidly supported on one said cross tie and non-rigidly supported on another said cross tie, said latter support comprising a motor frame pad, a trunnion rotatable therein and having a flat flanged portion, and a motor suspension bracket interposed between the cross tie wall and trunnion, said bracket being secured to the cross tie wall and having upper and lower ledges accommodating the trunnion flange therebetween.

9. In combination, a vehicle frame including cross ties, a motor frame supported between said cross ties, and a bracket adapted to fit snugly between a cross tie side wall and the motor frame, said bracket having a portion extending horizontally across the top of a cross tie and a portion extending beneath the motor frame, and shims interposed between the top of said cross tie and the horizontal portion of said bracket to adjust the vertical relation of said motor frame and vehicle frame.

10. In combination, a vehicle frame including cross ties having enlarged bolt holes in the side walls thereof, a motor frame supported between said cross ties, and a bracket adapted to fit snugly between a cross tie side wall and the motor frame, said bracket having a horizontal leg extending across the top of a cross tie and a portion extending beneath the motor frame, means passing through a cross tie bolt hole and said bracket for rigidly securing the motor frame to the cross tie, and shims interposed between the top of said cross tie and the horizontal leg of said bracket to adjust the vertical relation of said motor frame and vehicle frame.

In testimony whereof, I have hereunto signed my name at Altoona, Pennsylvania, this 4th day of November, 1930.

JOHN MORCH.